United States Patent [19]  [11] 3,918,178
Riley  [45] Nov. 11, 1975

[54] EDUCATIONAL PUZZLE
[76] Inventor: Colleen Riley, 30 Woodland Ave., Arcadia, Calif. 91006
[22] Filed: Sept. 9, 1974
[21] Appl. No.: 504,542

[52] U.S. Cl. .................... 35/31 G; 35/70; 35/73; 273/156
[51] Int. Cl.² .......................................... G09B 1/36
[58] Field of Search............. 35/31 R, 31 G, 32, 69, 35/70, 71, 72, 73, 35 J; 273/156, 157 R

[56] References Cited
UNITED STATES PATENTS
2,958,961 11/1960 Wheeler................................. 35/73
3,270,452 9/1966 D'Elia et al. ...................... 35/71 UX
3,822,487 3/1973 Koch.................................... 35/35 J
D163,085 5/1951 Bishop .............................. 35/70 X FOREIGN PATENTS OR APPLICATIONS
492,977 4/1954 Italy..................................... 35/35 J
1,505,611 11/1967 France................................. 35/31 G
749,444 5/1956 United Kingdom.................. 35/35 J Primary Examiner—Wm. H. Grieb
Attorney, Agent, or Firm—William W. Haefliger

[57] ABSTRACT
An educational puzzle or aid comprises alphanumeric characters in block form and having tongue and groove interconnections to orient sequence of a succession of the characters.

10 Claims, 4 Drawing Figures

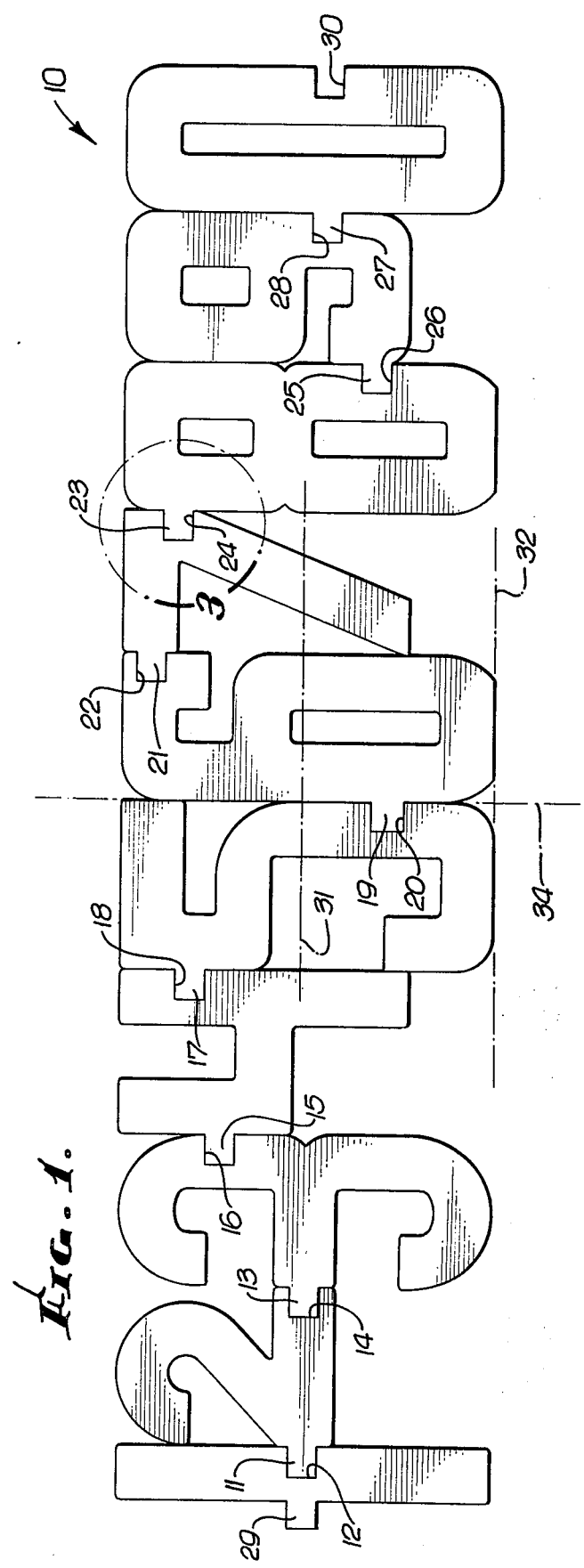
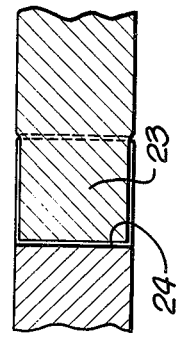
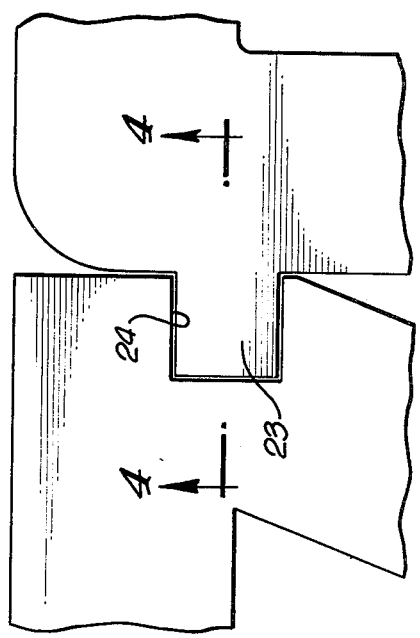
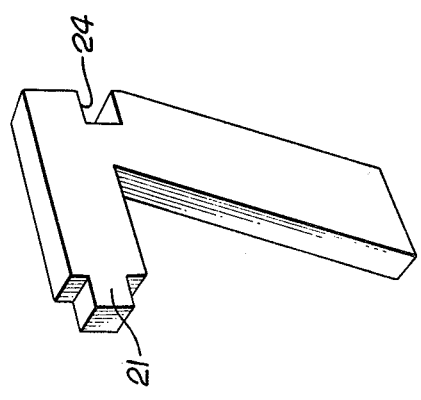

EDUCATIONAL PUZZLE

BACKGROUND OF THE INVENTION

This invention relates generally to educational aids, and more particularly concerns devices to assist learning of the proper sequence of progression, plus orientation, of alphanumeric characters (letters of the alphabet and/or arabic numerals).

There is a continuing need for educational aids to assist the teaching and learning of the proper sequence and orientation of arabic numerals and/or letters of the alphabet. To my knowledge there are no prior mechanical devices which may be hand-manipulated and which incorporate all the various and unusually advantageous features of the educational aid defined by the present invention.

SUMMARY OF THE INVENTION

Basically, the invention is embodied in an ordered succession of alphanumeric characters each in three dimensional block form, successive pairs of the block form characters having tongue and groove interconnections; and, the connections being staggered relative to a line extending lengthwise through the characters. As will be seen, the tongues of all characters may point in the same direction.

The characters may comprise arabic numerals certain of which are of one height and others of which are of lesser height; the tops and/or bottoms of certain characters may be co-linear, and the bottoms of certain alternate characters may be colinear; and two symmetrical sub-groups of numerals are defined, each sub-group including the same number of numerals and the same alternate size relationship as in the other sub-group, as will appear.

Various of the above geometrical features and relationships enable the learner, such as a child, to properly orient the numerals in left to right and up and down relationship, with the fronts of the numerals facing frontwardly, by virtue of an appreciation for such geometrical properties including alternations, consistencies and symmetrics.

These and other objects and advantages of the invention, as well as the details of an illustrative embodiment, will be more fully understood from the following description and drawings, in which:

DRAWING DESCRIPTION

FIG. 1 is a side elevation showing a sequence of interfitting block form alphanumeric characters;

FIG. 2 is a perspective showing of use of the FIG. 1 characters;

FIG. 3 is an enlarged side view of an interconnection seen in FIG. 1; and

FIG. 4 is a section on lines 4—4 of FIG. 3.

DETAILED DESCRIPTION

In FIG. 1 there is depicted an ordered succession or progression 10 of alphanumeric characters (in this instance they are numeric, but they may alternatively be letters of the alphabet) each in three dimensional block form. It will be seen that successive pairs of the block form characters have tongue and groove interconnection, as listed as follows:

| Character Pair | Tongue | Groove |
|---|---|---|
| 1,2 | 11 | 12 |
| 2,3 | 13 | 14 |
| 3,4 | 15 | 16 |
| 4,5 | 17 | 18 |
| 5,6 | 19 | 20 |
| 6,7 | 21 | 22 |
| 7,8 | 23 | 24 |
| 8,9 | 25 | 26 |
| 9,0 | 27 | 28 |
| 0,1 | 29 | 30 |

It will also be seen that the above interconnections are staggered relative to a line (as for example the line 31 bisecting numerals 1, 3, 5, 6, 8 and 0) extending lengthwise through the succession of characters. Also, the tongues of all characters point in the same direction, whereby a child cannot interfit the characters reversely so that he quickly learns the correct left-right orientation of the characters.

Further characteristics of the succession of characters are: the tops of at least certain characters, as for example all characters, are co-linear; the bottoms of certain characters are co-linear, as for example the bottoms of a group of numerals of the same height (thus, the bottoms of same-height numerals 1, 3, 5, 6, 8 and 0 define line 32); and numerals 1, 3, 5, 6, 8 and 0 are of one height, whereas numerals 2, 4, 7 and 9 are of substantially lesser height. Various of these characteristics prevent interfitting of the characters in upside down relation, so that a child quickly learns the correct right side up orientation of the characters, in their proper sequential relation.

The block form characters may have their front sides painted one-color, and their back sides painted a different color, to aid in proper front side orientation of the characters. Finally, they may have maximum heights on the order of 7–12 inches, for ease of ready handling and interfitting, other dimensions proportionally related to such heights, as indicated.

Finally, the group of interfitting numbers 1–5 is seen as symmetrical (or equal in number) to the group of interfitting numbers 6–0, since the adjacent numerals 5 and 6 of these two groups are of the same height and a vertical 34 therebetween separates the two groups in symmetrical relation.

I claim:

1. An educational aid comprising
   a. an ordered succession of alphanumeric characters each in three dimensional block form, the block forms having character outlines,
   b. each of the block form characters having a single tongue and groove interconnection within the height of a character, and
   c. said interconnections being staggered relative to a line extending lengthwise through said succession of characters.

2. The combination of claim 1 wherein the tongues of all characters point in the same direction.

3. The combination of claim 1 wherein the tops of at least certain characters are co-linear.

4. The combination of claim 3 wherein the tops of all the characters are co-linear.

5. The combination of claim 1 wherein the bottoms of certain characters are co-linear.

6. The combination of claim 5 wherein the bottoms of alternate characters are co-linear.

7. The combination of claim 1 wherein said characters comprise the arabic numerals 1, 2, 3, 4, 5, 6, 7, 8, 9 and 0.

8. The combination of claim 7 wherein certain odd numbered characters are of one height, and certain even number characters are of another height.

9. The combination of claim 7 wherein the numerals 1, 3, 5, 6, 8 and 0 are of one height, and the numerals 2, 4, 7 and 9 are of substantially lesser height.

10. The combination of claim 7 wherein alternate numerals 1, 3 and 5 in the group 1, 2, 3, 4 and 5 are of the same height, and alternate numerals 6, 8 and 0 in the group 6, 7, 8, 9 and 0 are of the same height.

* * * * *